United States Patent
Yoshida et al.

(10) Patent No.: US 6,515,848 B1
(45) Date of Patent: Feb. 4, 2003

(54) SOLID ELECTROLYTIC CAPACITORS AND METHOD FOR MANUFACTURING THE SAME

(75) Inventors: Katsuhiro Yoshida, Tokyo (JP); Kunihiko Simizu, Tokyo (JP); Toshihiko Nishiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/626,125

(22) Filed: Jul. 26, 2000

(30) Foreign Application Priority Data

Jul. 30, 1999 (JP) .......................... 11-218188

(51) Int. Cl.7 .................... H01G 9/02; H01G 9/042
(52) U.S. Cl. ............................. 361/525; 361/529
(58) Field of Search ............................ 361/523–540

(56) References Cited

U.S. PATENT DOCUMENTS

| | | | | |
|---|---|---|---|---|
| 5,457,862 A | * | 10/1995 | Sakata et al. | 29/25.03 |
| 5,461,537 A | * | 10/1995 | Koayashi et al. | 361/525 |
| 5,729,428 A | * | 3/1998 | Sakata et al. | 361/523 |
| 5,812,367 A | * | 9/1998 | Kudoh et al. | 361/523 |
| 6,110,234 A | * | 8/2000 | Sakata et al. | 29/25.03 |
| 6,215,651 B1 | * | 4/2001 | Takada et al. | 361/523 |
| 6,224,639 B1 | * | 5/2001 | Hamada et al. | 361/25.03 |

FOREIGN PATENT DOCUMENTS

| | | |
|---|---|---|
| JP | 64-32619 | 2/1989 |
| JP | 3-163816 | 7/1991 |
| JP | 5-36575 | 2/1993 |
| JP | 11-186104 | 7/1999 |
| KR | 1990-15200 | 10/1990 |
| KR | 1995-9763 | 4/1997 |

* cited by examiner

Primary Examiner—Anthony Dinkins
Assistant Examiner—Eric W. Thomas
(74) Attorney, Agent, or Firm—Sughrue Mion, PLLC

(57) ABSTRACT

The present invention relates to solid electrolytic capacitors with low ESRs in the high frequency range and methods for manufacturing the same. The solid electrolytic capacitor induce a porous anode body made of a valve action metal and on the surface of which body a dielectric oxide layer is formed; and a chemically polymerized layer made of conductive polymers which are formed by chemical oxide polymerization on the dielectric oxide layer which are located on the surfaces inside pores of the porous anode body; and an electrolytic polymerized layer made of conductive polymers which are formed by electrolytic polymerization on the dielectric oxide layer which are located on the external surface of the porous anode body; wherein the dielectric oxide layer and the electrolytic polymerized layer are in contact with each other and the chemically polymerized layer and the electrolytic polymerized layer are electrically connected with each other near the contacting parts.

4 Claims, 5 Drawing Sheets

FIG. 8
CONVENTIONAL
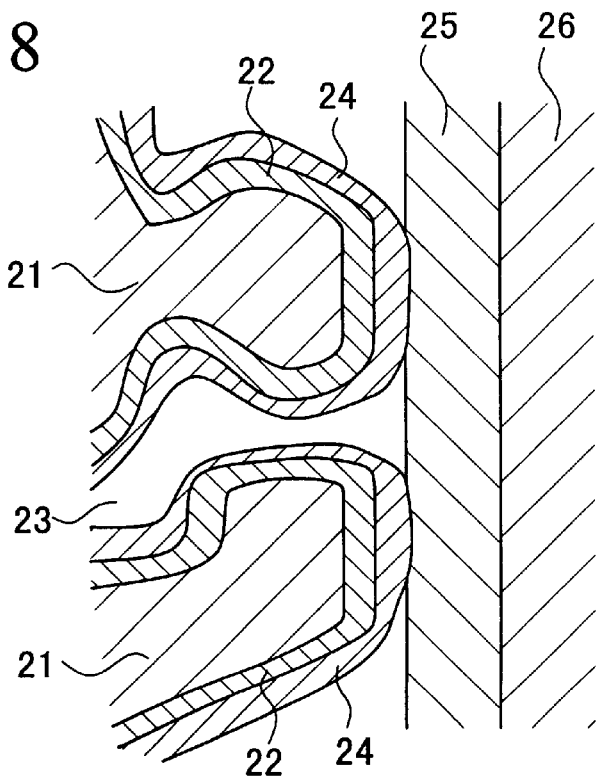

FIG. 9
CONVENTIONAL
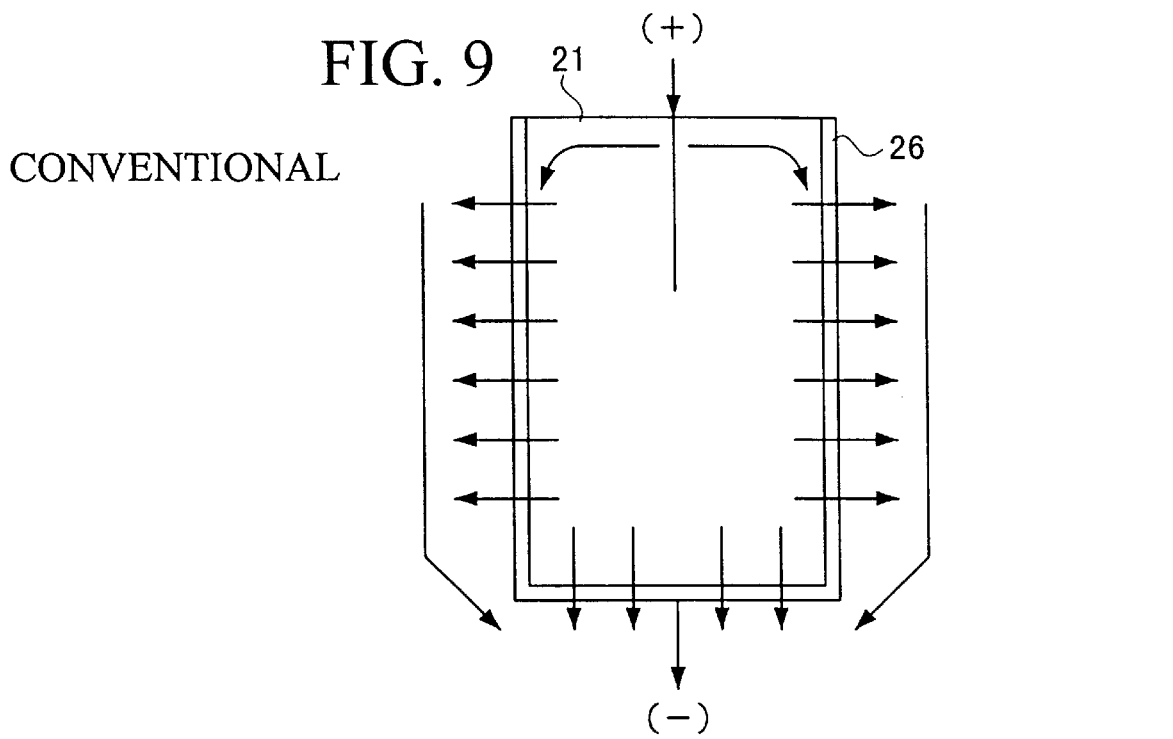
FIG. 10
CONVENTIONAL
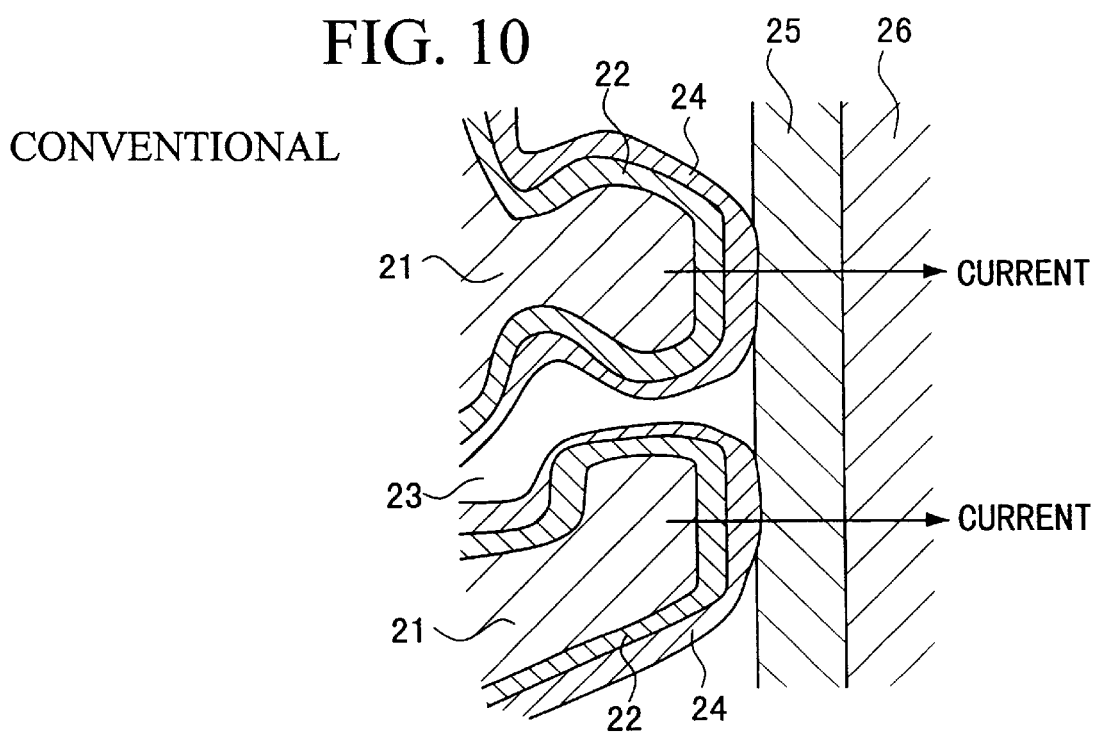

SOLID ELECTROLYTIC CAPACITORS AND METHOD FOR MANUFACTURING THE SAME

BACKGROUND OF THE INVENTION

1. Field of the Invention

This invention relates to solid electrolytic capacitors using conductive polymers as a solid electrolyte and a number of manufacturing the same, and more particularly to solid electrolytic capacitors ESRs (Equivalent Series Resistances) which are lower in high frequency range than those of conventional solid electrolytic capacitors.

This application is based on Patent Application No. Hei 11-218188 filed in Japan, the contents of which are incorporated herein by reference.

2. Background Art

With the rapid progress in the field of personal computers and other high-tech machines in recent years, the operation frequencies of CPUs and other devices used in them have reached the order of a few hundreds MHz, and therefore in CPUs and other devices, large capacity capacitors have begun to be used as rapidly operable power supplies, which operate at a speed which cannot be achieved with power circuits. Since large capacity capacitors cannot provide power instantly and errors may occur in operation of the CPU and other devices when the ESRs (Equivalent Series Resistances) of the large capacity capacitors are large, the ESRs must be as low as possible.

Solid electrolytic capacitors in the prior art include, for example, those manufactured through the following manufacturing process.

First, a fine powder of a metal such as tantalum, wherein an oxidation film is formed on the surface of the metal particles (a valve action metal), is shaped into a pillar, such as a circular pillar or a rectangular pillar, with an anode lead being provided at one end, the shaped pillar is sintered, and thus a porous anode body with countless small pores in the pillar is obtained. Next, a film of metal oxide as a dielectric layer is formed on the surfaces inside the pores of the anode body and the external surface of the anode body. Techniques such as anode oxidation are used to form the dielectric oxide layer.

Next, a layer of a solid electrolyte such as manganese dioxide is formed on the dielectric oxide layer and then a cathode layer is formed on the solid electrolyte layer. The cathode layer provides a low resistance between the solid electrolyte layer and the external cathode terminal which is made later. The cathode layer is formed, for example, by layering a silver paste layer and a solder layer. Next, this manufactured structure is provided with a cathode terminal for external electric connection, and the structure is encapsulated and sealed by a layer such as a resin layer for molding, and the structure is provided with terminals, and whereby a solid electrolytic capacitor is obtained.

A solid electrolytic capacitor having a porous sintered body as an anode has a large capacity even if its volume is small. However, such a solid electrolytic capacitor has the disadvantage that its ESR is large. The is because that the electric resistances of the solid electrolyte layers are large, because the solid electrolyte layers formed in the small pores are long and thin and MnO2 and other materials used in the solid electrolyte layers are semiconductors.

For this reason, solid electrolytic capacitors in which conductive polymers, which have a lower electric resistance by a factor of a thousand compared with those of MnO2 and other materials, are used, have been developed.

Methods to form a solid electrolyte layer made of such conductive polymers include chemical oxidation polymerization in which monomers for forming conductive polymers are chemically polymerized with chemicals such as oxidants and electrolytic polymerization in which monomers for forming conductive polymers are electrochemically polymerized.

The electric resistances of the conductive polymers produced by the chemical oxidation polymerization are higher (by a few times to a hundred times) than those of conductive polymers produced by the electrolytic polymerization if common monomers for forming conductive polymers are used. For that reason, it is preferable to use the conductive polymers produced through the electrolytic polymerization in order to reduce the ESR in the solid electrolytic capacitors.

However, the electrolytic polymerization has the disadvantage that it is difficult to form conductive polymers produced by the electrolytic polymerization on the dielectric oxide layer because electrolytic polymerization is a kind of electrochemical reaction and cannot be carried out on insulators such as dielectric oxide layers in which electric current cannot flow. For this reason, it is necessary that one conductive polymer (chemically polymerized layer 24) are formed in advance on dielectric oxide layers 22 on a porous anode body 21 by chemical oxidation polymerization, as shown in FIG. 8, and then the other conductive polymers (electrolytic polymerized layer 25) are formed on the chemically polymerized layer 24 by electrolytic polymerization to form a two-layer structure with chemically polymerized layer 24. The electrolytic polymerized layer 25 is difficult to form on the surfaces inside the pores 23 of the anode body 21 and is formed mainly on the external surface of the anode body 21. Such a solid electrolytic capacitor using a solid electrolyte layer made of a two-layer structure of conductive polymers is disclosed, for example, in Japanese Examined Patent Application No. Hei 4-74853.

Although the electric resistance of such a two-layered structure is larger than that of a structure made of only electrolytic polymerized layers 25 since alternating currents must pass through the chemically polymerized layer 24, the electric resistances of the chemically polymerized layer 24 was not considered to present a significant problem because the chemically polymerized layer 24 is indispensable as an underlayer for the electrolytic polymerized layer 25 and the chemically polymerized layer 24 has a much lower resistance than the prior art layers such MnO2.

However, solid electrolytic capacitors using a solid electrolyte layer made of a two-layered structure of conductive polymers, when used at high frequencies (about 100 kHz), have the problem that their ESRs are larger than those of the prior art. The large ESP results from the following mechanism. Electric current passes through the porous anode body 21, the chemical polymerized layer 24, the electrolytic polymerized layer 25, and the cathode 26 in turn, as shown in FIGS. 9 and 10, and particularly at high frequencies, electric current passes only through the parts of those constituent elements which are located near the outer surface of the porous anode body 21, and thereby the resistance of the parts of the chemical polymerized layer 24, which are located near the outer surface of the porous anode body 21, have a large effect on the total resistance. In view of the need that has risen in recent years for solid electrolytic capacitors with low ESRs, it has become important to reduce the ESR values even if only by a few mΩ to 10 mΩ. For this reason, it is desired to obtain solid electrolytic layers with the lowest resistance possible.

SUMMARY OF THE INVENTION

The purpose of the present invention is to provide solid electrolytic capacitors with low ESRs in the high frequency range and methods for manufacturing the same.

The solid electrolytic capacitors of the present invention comprise a porous anode body made of a valve action metal and on the surface of which body a dielectric oxide layer is formed; and a chemically polymerized layer made of conductive polymers which are formed by chemical oxide polymerization on the dielectric oxide layer located on the surfaces inside the pores of the porous anode body; and an electrolytic polymerized layer made of conductive polymers which are formed by electrolytic polymerization on the dielectric oxide layer located on the external surface of the porous anode body; wherein the dielectric oxide layer and the electrolytic polymerized layer are in contact with each other and the chemically polymerized layer and the electrolytic polymerized layer are electrically connected with each other near the contacting parts.

The method for manufacturing solid electrolytic capacitors of the present invention comprises the steps of: forming a dielectric oxide layer on a surface of a porous anode body which is made of a valve action metal; and forming a chemically polymerized layer made of conductive polymers by chemical oxide polymerization by means of repeating more than one cycle of the following two substeps, one substep being immersing the porous anode body with the dielectric oxide layer in a solution which includes 10% to 60% oxidant per weight of the solution, and then drying the porous anode body with the dielectric oxide layer, and the other substep being immersing the dried porous anode body with the dielectric oxide layer in a solution including monomers for forming conductive polymers and then cleaning the immersed porous anode body with the dielectric oxide layer; and immersing the porous anode body with the dielectric oxide layer and the chemically polymerized layer in a solution including dopants and monomers for forming conductive polymers and forming an electrolytic polymerized layer made of conductive polymers by electrolytic polymerization.

In the method for manufacturing solid electrolytic capacitors of the present invention, it is preferable that the solvent used for the solution including an oxidant is water or methanol.

Additionally, in the method for manufacturing solid electrolytic capacitors of the present invention, it is preferable that the porous anode body with the dielectric oxide layer is cleaned with water or methanol between the two substeps, one substep being immersing the porous anode body with the dielectric oxide layer in a solution which includes an oxidant and then drying the porous anode body with the dielectric oxide layer, and the other substep being immersing the dried porous anode body with the dielectric oxide layer in a solution including monomers for forming conductive polymers and then rinsing the porous anode body with the dielectric oxide layer.

BRIEF DESCRIPTION OF THE DRAWINGS

FIG. 8 shows a schematic cross section of a conventional solid electrolytic capacitor.

FIG. 9 shows a schematic cross section of a conventional solid electrolytic capacitor, schematically showing the distribution of electric current flow when electric current flows at high frequencies in the solid electrolytic capacitor.

FIG. 10 shows a schematic cross section of a conventional solid electrolytic capacitor, showing the path of the electric current flow when electric current flows at high frequencies in the solid electrolytic capacitor.

DETAILED DESCRIPTION OF THE PREFERRED EMBODIMENTS

Hereafter, the present invention will be described in detail in reference to the figures appended.

Figure 1:
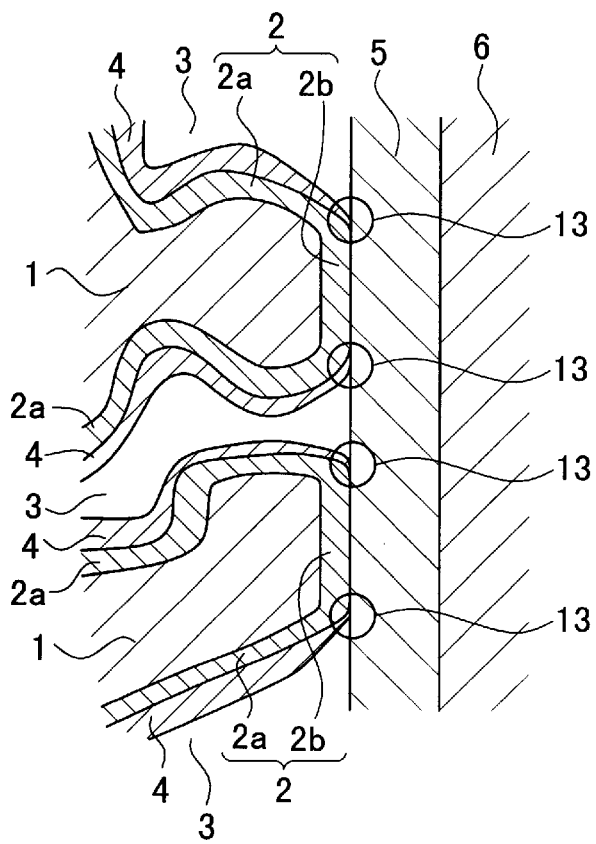
FIG. 1 shows a cross section of an embodiment of a solid electrolytic capacitor of the present invention.

FIG. 1 shows a schematic cross section of an embodiment of the solid electrolytic capacitor of the present invention.

The solid electrolytic capacitor of the present invention comprises a porous anode body 1 made of a valve action metal and on the surface of which body a dielectric oxide layer 2a, 2b is formed; and a chemically polymerized layer 4 made of conductive polymers which are formed by chemical oxide polymerization on the dielectric oxide layer 2a located on the surfaces inside pores 3 of the porous anode body 1; and an electrolytic polymerized layer 5 made of conductive polymers which are formed by electrolytic polymerization on the dielectric oxide layer 2b located on the external surface of the porous anode body 1 and at the openings of the pores 3; a cathode layer 6 which is formed on electrolytic polymerized layer 5. The solid electrolytic capacitor is therefore characterized that the dielectric oxide layer 2b located on the external surface of the porous anode body 1 and the electrolytic polymerized layer 5 are in contact with each other, and since the chemically polymerized layer 4 and the electrolytic polymerized layer 5 are in contact with each other near the contacting parts 13, they are electrically connected with each other while the there is no chemically polymerized layer 4 on the dielectric oxide layer 2b which is located on the external surface of the porous anode body 1.

Tantalum, aluminum, niobium, titanium, zirconium, magnesium and so on are used as the valve action metals of the porous anode body 1. Tantalum is generally used.

The formation of the dielectric oxide layer 2 is carried out by anodic oxidation of the porous anode body 1. When tantalum is used as a valve action metal, tantalum oxide is formed.

Polypyrrole, polythiophene, polyaniline, their substitution products and so on are used as conductive polymers of which the chemically polymerized layer 4 is made. Polypyrrole and its substitution products, which are easily polymerized by chemical polymerization, are preferable.

Polypyrrole, its substitution products and so on are used as the conductive polymers of which the electrolytic polymerized layer 5 is made.

Known layers such as layers which are made of a graphite paste layer and a silver paste layer can be used as the cathode layer 6.

Figure 2:
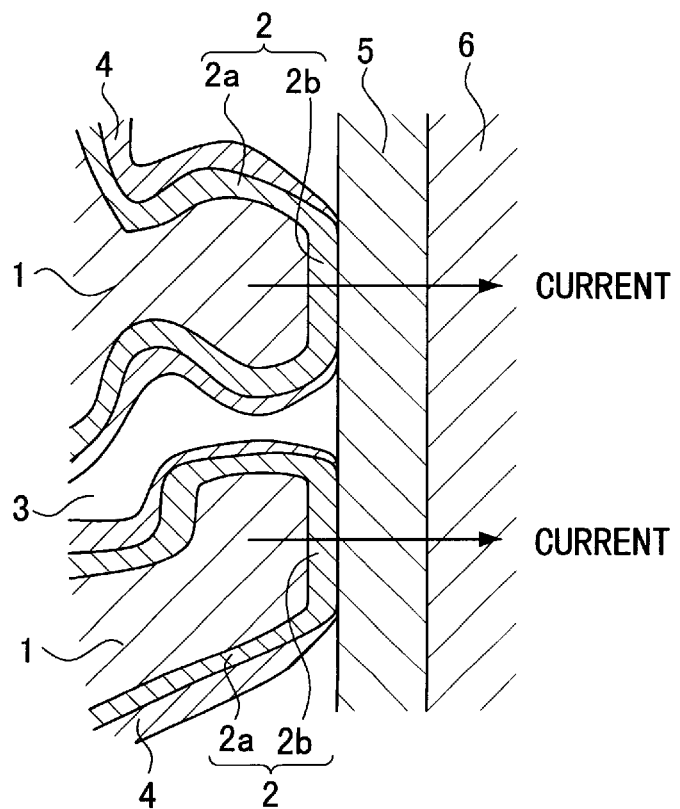
FIG. 2 shows a schematic cross section of an embodiment of a solid electrolytic capacitor of the present invention, schematically showing the path of the electric current flow when electric current flows at high frequencies in the solid electrolytic capacitor.

When an electric current at high frequencies flows in the solid electrolytic capacitor, as shown in FIG. 2, it passes through the porous anode body 1, the electrolytic polymerized layer 5, and the cathode 6 in turn. On the other hand, when electric current at high frequencies flows in a conventional solid electrolytic capacitor, electric current passes through the porous anode body 21, the chemical polymerized layer 24, the electrolytic polymerized layer 25, and the cathode 26 in turn, as shown in FIG. 10. Because, as described above, the electric current does not pass through the chemical polymerized layer 4 having a large resistance in the solid electrolytic capacitor of the present invention, the ESRs at high frequencies can be reduced.

Hereafter, the method for manufacturing the solid electrolytic capacitors of the present invention will be described for the case that tantalum is used as a valve action metal and polypyrrole is used as a conductive polymer.

Figure 3:
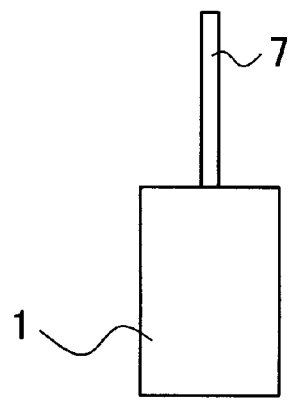
FIG. 3 is a schematic front view of an embodiment of a porous anode body which is used in a solid electrolytic capacitor of the present invention.

First, a tantalum powder is shaped into a pressed pillar with an anode lead 7 (which is made of tantalum) being provided at one end, by means of a pressing technique, and this pillar is sintered and finally the porous anode body 1 for the solid electrolytic capacitor, as shown in FIG. 3, can be obtained.

Figure 4:
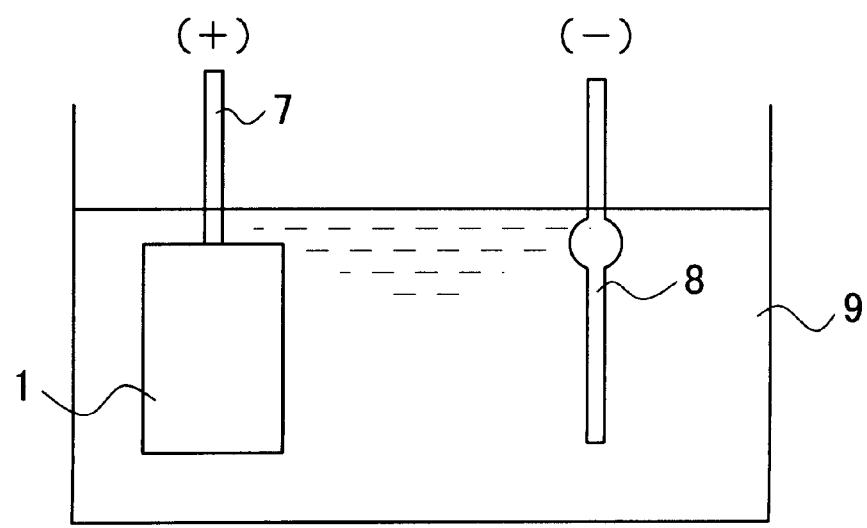
FIG. 4 shows a schematic front view of an embodiment of a device for anodic oxidation of a porous anode body.
Figure 5:
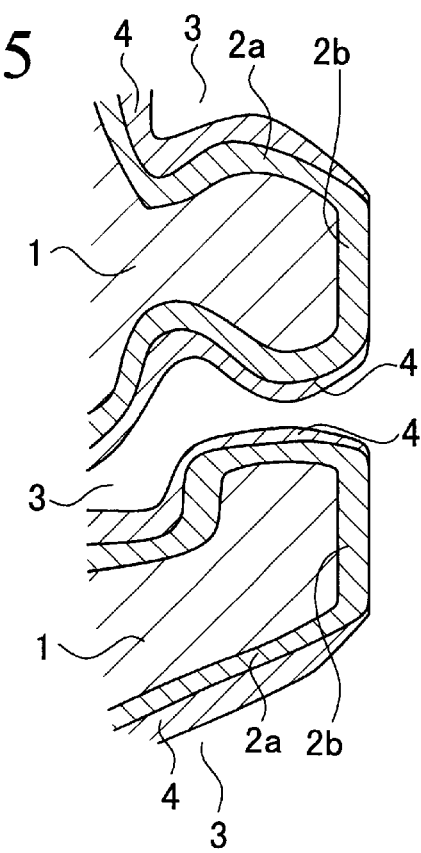
FIG. 5 shows a schematic cross section of a porous anode body on the surfaces of which a chemically polymerized layer is formed.

Next, as shown in FIG. 4, the porous anode body 1 and an opposing electrode 8 are immersed in a electrolyte 9 and the dielectric oxide layer 2 is formed on the surfaces of the porous anode body 1 by anodic oxidation.

The porous anode body 1 oxidized by the anodic oxidation is immersed in a solution which includes 10% to 60% of an oxidant by weight of the solution, and then dried, and thereby crystals of the oxidant precipitate on the dielectric oxide layer 2a which are located on the surfaces inside pores 3 of the porous anode body 1.

Next, this porous anode body 1 is immersed in a solution including pyrrole for achieving the chemical oxidation polymerization, and then dried, whereby the chemical oxidation polymerization is completed. Then residual materials which are not reacted and sub-products which do not contribute to the total conductivity are removed by rinsing the porous anode body 1 with methanol and so on, and thereafter the chemically polymerized layer 4 is formed on the dielectric oxide layer 2a located on the surfaces inside pores 3 of the porous anode body 1.

The steps of the precipitation of the crystals of the oxidant and of the chemical oxidation polymerization may be repeated more than two times, if necessary.

Figure 6:
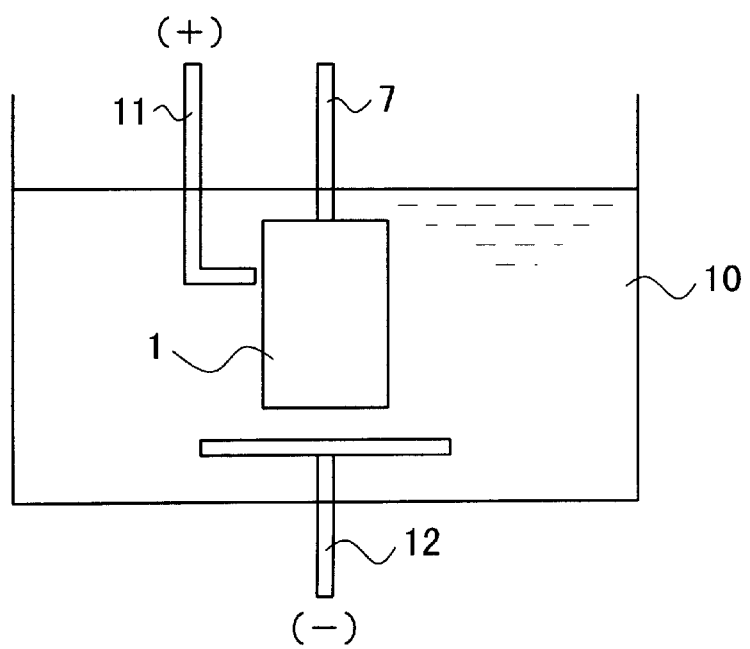
FIG. 6 shows a schematic front view of an embodiment of a device for electrolytic polymerization.
Figure 7:
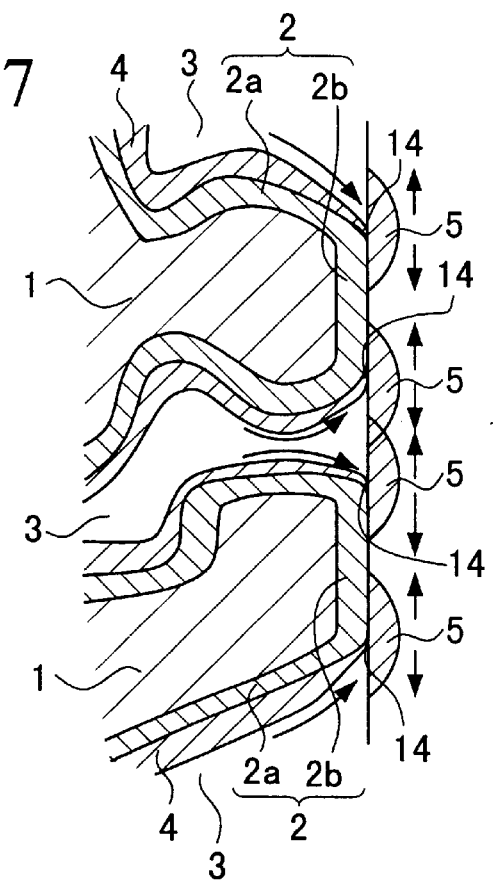
FIG. 7 is a cross section which schematically shows formation of an electrolytic polymerized layer.

As shown in FIG. 6, the porous anode body 1 with the chemically polymerized layer 4 is immersed in a solution 10 for carrying out the electrolytic polymerization including dopants and monomers for forming conductive polymers, and SUS electrodes 11, 12 are placed near the porous anode body 1 to make electric current flow. At the same time, the electric current flows through the chemically polymerized layer 4 which is formed on the surfaces inside the porous anode body 1 and flows out from the other surfaces which are not located near the SUS electrode 11 into the solution for achieving the electrolytic polymerization. Because of this electric current flow, the electrolytic polymerized layer 5 grows two-dimensionally on the dielectric oxide layer 2b which are located on the external surface of the porous anode body 1, with the ends 14 of the chemically polymerized layer 4, which are positioned near the surfaces which is located on the external surface of the porous anode body 1, as starting points. At this time, there is almost no growth of the electrolytic polymerized layer 5 inside the pores 3. Since there are many points for electric current flow on the external surface of the porous anode body 1, the electrolytic polymerized layer 5 fully covers on the external surface of the porous anode body 1.

The cathode layer 6, which is made of a graphite paste layer and a silver paste layer, is formed on the porous anode body 1 having the electrolytic polymerized layer 5. Next, the porous anode body 1 is provided with a metal external terminal by means of welding, or adhesion, and is encapsulated by a resin layer for the purpose of humidity-proofing and ease of handling, and whereby a solid electrolytic capacitor is obtained.

In this embodiment, the oxidant solution must include 10% to 60% oxidant per weight of the solution, preferably 30 weight % to 50 weight %, more preferably 35 weight % to 45 weight %. If the oxidant concentration is less than 10 weight %, besides requiring a long time to dry, only a small amount of crystals of the oxidant precipitate and production efficiency is low. If the concentration is more than 60 weight %, the oxidant crystals precipitate on the dielectric oxide layer 2b which is located on the external surface of the porous anode body 1 forming a chemically polymerized layer 4.

The immersion time of the porous anode body 1 in the oxidant solution is not restricted, but is generally ten seconds to 10 minutes.

Oxidants which are generally used for chemical oxide polymerization can be used as an oxidant and are not be restricted. For example, aromatic sulfonic acid salts, such as dodecylbenzene ferric sulfonic acid and paratoluene ferric sulfonic acid, can be used. Metal ions such as an iron ion act as an oxidant, and sulfonic acid ions act as a dopant for the coexistence with monomers for forming the conductive polymer.

Water and alcohols such as methanol, isopropyl alcohol and ethanol can be used as solvents of the oxidant solution. Water and methanol are preferable because it is difficult for the oxidant crystals to precipitate on the dielectric oxide layer 2b which are located on the external surface of the porous anode body 1.

If a large amount of oxidant crystals are observed on the external surface of the porous anode body 1 after the immersion of the porous anode body 1 in the oxidant solution and drying, the external surface of the porous anode body 1 can be immersed in water or methanol and be rinsed there.

Water and alcohols such as methanol, isopropyl alcohol and ethanol are used as solvents of the solutions for chemical oxide polymerization or electrolytic polymerization.

Alkali metal salts of aromatic sulfonic acids, such as dodecylbenzene ferric sulfonic acid sodium are used as the dopants contained in the solutions for electrolytic polymerization In the method for manufacturing solid electrolytic capacitors of the present invention, the chemically polymerized layer 4 is formed only on the dielectric oxide layer 2a located on the surfaces inside the pores 3 of the porous anode body 1 and only the ends 14 of the chemically polymerized layer 4 appear on the external surface of the porous anode body 1, while the electrolytic polymerized layer 5 is formed on the dielectric oxide layer 2b located on the external surface of the porous anode body 1. That is, on the external surface of the porous anode body 1, only the electrolytic polymerized layer 5 is formed, while the chemically polymerized layer 4 is not formed, In other words, both the electrolytic polymerized layer 5 and the chemically polymerized layer 4 do not overlap each other on the external surface of the porous anode body 1. For this reason, the solid electrolytic capacitor has a low ESR at high frequencies In the embodiment, using an oxidant solution having a specific oxidant concentration, the chemically polymerized layer 4 is formed only on the dielectric oxide layer 2a which is located on the surfaces inside pores 3 of the porous anode body 1. Other methods can be used for the formation of the chemically polymerized layer 4 on the only on the dielectric oxide layer 2a located on the surfaces inside the pores 3 of the porous anode body 1.

EXAMPLES

Hereafter, Some Examples are Shown

The evaluation method in the present invention is as follows. ESR measurement:

Measurement conditions: measurement frequency=100 kHz, measurement voltage=1 Vrms (1.5 VDC bias applied)

Example 1

Manufacture of a Porous Anode Body

A tantalum powder was shaped into a pressed pillar having an anode lead (which is made of tantalum) provided at one end, by a pressing technique. The pillar was sintered at a temperature of 1600° C. for 30 minutes to obtain a porous anode body.

Next, the porous anode body and an opposing electrode were immersed in a solution including 0.6% phosphoric acid by weight of the solution, and a dielectric oxide layer was formed on the surfaces of the porous anode body by anodic oxidation by applying a voltage of 18 V.

Formation of a Chemically Polymerized Layer

The porous anode body oxidized by the anodic oxidation was immersed for 5 minutes in a solution which included 40% dodecylbenzene ferric sulfonic acid by weight of the solution, and then dried at a temperature of 25° C. for 60 minutes, and thereby crystals of dodecylbenzene ferric sulfonic acid educed on the dielectric oxide layer which is located on the surfaces inside the pores of the porous anode body.

Next, this porous anode body was immersed for 20 minutes in a solution including 5% pyrrole for carrying out the chemical oxidation polymerization, then dried at a temperature of 25° C. for 60 minutes to complete the chemical oxidation polymerization on the porous anode body, and it was rinsed with methanol, and whereby the chemically polymerized layer was formed on the dielectric oxide layer located on the surfaces inside the pores of the porous anode body.

Formation of an Electrolytic Polymerized Layer

The porous anode body with the chemically polymerized layer was immersed in a solution for electrolytic polymerization including 20 weight % dodecylbenzene ferric sulfonic acid sodium and 5 weight % pyrrole, and SUS electrodes were placed near the porous anode body to make electric current flow for 30 minutes, and an electrolytic polymerized layer was formed on the dielectric oxide layer on the external surface of the porous anode body. The voltage applied for the electrolytic polymerization was adjusted to 1 V (Ag/AgCl) when the voltage was measured using a silver/silver chloride electrode as a reference electrode.

Formation of a Cathode Layer and Encapsulation

A cathode layer made of a graphite paste layer and a silver paste layer was formed on the porous anode body having the electrolytic polymerized layer. Next, the porous anode body 1 was provided with a metal external terminal, and was encapsulated with resin, and whereby a solid electrolytic capacitor was obtained.

The ESRs of the solid electrolytic capacitors obtained were measured. The measurements were carried out at ten points and the maximum value, minimum value and average value were obtained. The results are shown in Table 1.

Reference 1

Measurements were carried out under the same conditions as Example 1, except that the oxidant concentration of the solution was 70 weight %. A solid electrolytic capacitor having a solid electrolytic layer consisting of the two-layered structure was obtained, which structure was made of the chemically polymerized layer and the electrolytic polymerized layer formed on the dielectric oxide layer located on the external surface of the porous anode body.

The ESRs of the solid electrolytic capacitors obtained was measured. The measurements were carried out at ten points and the maximum value, minimum value and average value were obtained. The results are shown in Table 1.

Reference 2

Formation of a Chemically Polymerized Layer

A porous anode body oxidized by anodic oxidation which was manufactured in the same way as in Example 1 was immersed in a solution of 70% dodecylbenzene ferric sulfonic acid by weight of the solution for 5 minutes, and then dried at a temperature of 25 centigrades for 60 minutes, whereby crystals of dodecylbenzene ferric sulfonic acid educed on the dielectric oxide layer located on the surfaces inside the pores of the porous anode body.

Next, this porous anode body was immersed for 20 minutes in a 5 weight % pyrrole solution to carry out the chemical oxidation polymerization, then dried at a temperature of 25° C. for 60 minutes, to complete the chemical oxidation polymerization on the porous anode body, and unreacted residual materials and sub-products which unrelated to conductivity were removed by rinsing the porous anode body 1 with methanol.

The process above was repeated three times and thereafter a chemically polymerized layer was formed on the dielectric oxide layer located on the surfaces inside the pores of the porous anode body and on the external surface of the porous anode body.

Formation of a Cathode Layer and Encapsulation

A cathode layer made of a graphite paste layer and a silver paste layer was formed on the porous anode body with the electrolytic polymerized layer. Next, the porous anode body 1 was provided with a metal external terminal, and was encapsulated with resin, and whereby a solid electrolytic capacitor was obtained.

The ESRs of the solid electrolytic capacitors obtained were measured. The measurements were carried out at ten points and the maximum value, minimum value and average value were obtained. The results are shown in Table 1.

TABLE 1

| | Layer structure located on the external surface of the porous anode body | Maximum ESR (units: mΩ at 100 kHz) | Minimum ESR (units: mΩ at 100 kHz) | Average ESR (units: mΩ at 100 kHz) |
|---|---|---|---|---|
| Ex. 1 | E.P.L. | 43 | 28 | 35 |
| Ref 1 | C.P.L. + E.P.L. | 50 | 33 | 40 |
| Ref 2 | C.P.L. | 70 | 40 | 55 |

E.P.L.: electrolytic polymerized layer
C.P.L.: chemically polymerized layer

As described above, since the solid electrolytic capacitor of the present invention comprises a porous anode body made of a valve action metal and on the surface of which body a dielectric oxide layer is formed; and a chemically polymerized layer made of conductive polymers which are formed by chemical oxide polymerization on the dielectric oxide layer located on the surfaces inside the pores of the porous anode body, and an electrolytic polymerized layer made of conductive polymers which are formed by electrolytic polymerization on the dielectric oxide layer located on the external surface of the porous anode body; wherein the dielectric oxide layer and the electrolytic polymerized layer are in contact with each other and the chemically polymerized layer and the electrolytic polymerized layer are electrically connected with each other near the contacting parts, the ESR at high frequencies can be reduced.

Since the method for manufacturing solid electrolytic capacitors of the present invention comprises the steps of: forming a dielectric oxide layer on a surface of a porous anode body which is made of a valve action metal; and forming a chemically polymerized layer made of conductive polymers by chemical oxide polymerization by means of repeating more than one cycle of the following two substeps, one substep being immersing the porous anode body with the dielectric oxide layer in a solution which includes 10% to 60% of an oxidant by weight of the solution, and then drying the porous anode body with the dielectric oxide layer, and the other substep being immersing the dried porous anode body with the dielectric oxide layer in a solution including monomers for forming conductive polymers and then cleaning the immersed porous anode body with the dielectric oxide layer; and immersing the porous anode body with the dielectric oxide layer and the chemically polymerized layer in a solution including dopants and monomers for forming conductive polymers and forming an electrolytic polymerized layer made of conductive polymers by electrolytic polymerization, with no chemically polymerized layer being formed on the dielectric oxide layer located on the external surface of the porous anode body, and solid electrolytic capacitors with low ESR at high frequencies can be obtained.

If the solvent used for the solution including an oxidant is water or methanol, no oxidant crystals educe on the dielectric oxide layer located on the external surface of the porous anode body and no chemically polymerized layer is formed on the dielectric oxide layer located on the external surface of the porous anode body.

Additionally, if the porous anode body with the dielectric oxide layer is cleaned with water or methanol between the two substeps, one substep being immersing the porous anode body with the dielectric oxide layer in a solution which includes an oxidant and then drying the porous anode body with the dielectric oxide layer, and the other substep being immersing the dried porous anode body with the dielectric oxide layer in a solution including monomers for forming conductive polymers and then rinsing the porous anode body with the dielectric oxide layer, the oxidant crystals, which deposit on the dielectric oxide layer located on the external surface of the porous anode body, can be removed and no chemically polymerized layer is formed on the dielectric oxide layer located on the external surface of the porous anode body.

What is claimed is:

1. A solid electrolytic capacitor comprising:

a porous anode body made of a valve action metal and on the surface of said body a dielectric oxide layer is formed; and a chemically polymerized layer made of at least one conductive polymer which is formed by chemical oxide polymerization on the dielectric oxide layer which is located on the surfaces inside pores of the porous anode body, wherein the chemically polymerized layer is formed directly on the oxide layer; and an electrolytic polymerized layer made of at least one conductive polymer which is formed by electrolytic polymerization on the dielectric oxide layer which is located on the external surface of the porous anode body;

wherein said pores are not completely filled with said chemically polymerized layer, said dielectric oxide layer and said electrolytic polymerized layer are in contact with each other, and said chemically polymerized layer and said electrolytic polymerized layer are in contact with each other and electrically connected with each other only at contacting parts.

2. The solid electrolytic capacitor according to claim 1, wherein the valve action metal is at least one metal selected from the group consisting of tantalum, aluminum, niobium, titanium, zirconium, and magnesium.

3. The solid electrolytic capacitor according to claim 1, wherein the conductive polymer of the chemically polymerized layer is at least one selected from the group consisting of polypyrrole, polythiophene, polyaniline and derivatives thereof.

4. The solid electrolytic capacitor according to claim 1, further comprising a cathode layer which is a silver paste layer or a graphite paste layer.

* * * * *

UNITED STATES PATENT AND TRADEMARK OFFICE
CERTIFICATE OF CORRECTION

PATENT NO.     : 6,515,848 B1
DATED          : February 4, 2003
INVENTOR(S)    : Katsuhiro Yoshida, Kunihiko Simizu and Toshihiko Nishiyama It is certified that error appears in the above-identified patent and that said Letters Patent is hereby corrected as shown below:

<u>Title page,</u>
Item [73], Assignee, should read as follows: -- NEC TOKIN Corporation, Miyagi (JP) --

Signed and Sealed this

Twenty-ninth Day of July, 2003

JAMES E. ROGAN
*Director of the United States Patent and Trademark Office*